United States Patent [19]

Harvey

[11] Patent Number: 4,903,053
[45] Date of Patent: Feb. 20, 1990

[54] CAMERA APPARATUS

[75] Inventor: Donald M. Harvey, Webster, N.Y.

[73] Assignee: Eastman Kodak Company, Rochester, N.Y.

[21] Appl. No.: 296,476

[22] Filed: Jan. 12, 1989

[51] Int. Cl.$^4$ .................... G03B 7/00; G03B 17/26
[52] U.S. Cl. .................... 354/21; 354/275; 242/71.1
[58] Field of Search ........... 354/21, 275, 215, 212; 352/92; 242/71, 71.1, 71.2

[56] References Cited

U.S. PATENT DOCUMENTS

| | | | |
|---|---|---|---|
| 1,685,010 | 9/1928 | Thornton | 242/71.1 |
| 3,467,341 | 9/1969 | Roman | 242/197 |
| 4,176,927 | 12/1979 | Wagensonner | 354/21 |
| 4,395,107 | 7/1983 | Lührig et al. | 354/275 |
| 4,423,943 | 1/1984 | Gold | 354/275 |

Primary Examiner—Michael L. Gellner
Assistant Examiner—Brian W. Brown
Attorney, Agent, or Firm—Roger A. Fields

[57] ABSTRACT

In a photographic camera, apparatus is provided for determining when, in a film cassette, a reduced-width trailing end portion of the filmstrip has fallen off a film support which normally positions the filmstrip within range of a tooth for engaging the film leader prior to initial film advance from the cassette shell or following midroll film return to the shell. During a film loading sequence of the photographic camera, the determination that the film leader is positioned out of range of the tooth automatically prevents operation of the film transport or other means, whereby one is alerted not to use the filmstrip.

5 Claims, 7 Drawing Sheets

CAMERA APPARATUS

CROSS-REFERENCE TO RELATED APPLICATIONS

Reference is made to commonly assigned copending U.S. applications Ser. No. 07/296,558, entitled FILM CASSETTE, and filed Jan. 12, 1989 in the name of Donald M. Harvey, and Ser. No. 221,955, entitled MOTOR-DRIVEN FILM TRANSPORT APPARATUS, and filed July 20, 1988 in the name of Donald M. Harvey.

Both of the cross-reference applications are incorporated in this application by the foregoing references.

BACKGROUND OF THE INVENTION

1. Field of the Invention

The invention relates generally to the field of photography, and particularly to camera apparatus for preventing double exposure of an exposed film load.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading of forward-most portion of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is manually rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, can be operated to automatically advance a film leader out of the cassette shell by rotating the film spool in the unwinding direction. The film leader originally is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the forward or leading end of the filmstrip is reduced in width to allow it to protrude from between the circumferential lips and rest against the shell wall at a location inwardly of a film passageway to the outside of the cassette shell. During initial unwinding rotation of the film spool, the leading end of the filmstrip is required to "seek" the entrance to the film passageway. Then, it is advanced into and through the film passageway to exit the cassette shell. If the filmstrip is rewound midroll into the cassette shell, i.e., before all of the available imaging areas are exposed, because the photographer wishes to change the film type, the film leader will be returned to its original location inwardly of the film passageway. Thus, in order to re-use the filmstrip to expose its remaining imaging areas, the leading end of the film leader will be required again to seek the entrance to the film passageway to exit the cassette shell.

CROSS-REFERENCED APPLICATION SERIAL NO. 296,558

This cross-reference application discloses an improved cassette wherein a film engaging member, located along a film passage slit to the outside of the cassette shell, is adapted to enter a trapping perforation in a leader portion of the filmstrip to secure the leader portion in the slit prior to initial advance of the filmstrip from the shell or following midroll return of the filmstrip to the shell. A trailing end portion of the filmstrip has a cut-out which enables the filmstrip to fall away from a film support for normally positioning the filmstrip within range of the engaging member, when the filmstrip is advanced sufficiently from the cassette shell to move the cut-out to the support.

With the improved cassette, therefore, the leader portion can advantageously be secured in the film passage slit prior to initial advance of the filmstrip from the cassette shell and following midroll return of the filmstrip to the cassette shell. However, when the filmstrip is completely exposed and returned to the cassette shell, the leader portion cannot be secured in the film passage slit because the filmstrip will have fallen out of range of the film engaging member. Thus, the leader portion will be wound onto the film spool.

SUMMARY OF THE INVENTION

The invention relates to camera apparatus intended for use with the film cassette disclosed in cross-referenced application Ser. No. 296,558.

Specifically, there is provided camera apparatus intended for use with a film cassette including (a) an internal film engaging member for engaging a leader portion of a filmstrip prior to its initial advance from the cassette shell and for re-engaging the leader portion following its return to the shell, (b) an internal film support for normally supporting the filmstrip within range of the film engaging member to permit the engaging member to engage the leader portion, (c) a trailing end portion of the filmstrip configured to fall away from the film support to move the filmstrip out of range of the film engaging member, when the filmstrip has been advanced sufficiently from the cassette shell to position the trailing end portion at the film support, to prevent the engaging member from re-engaging the leader portion following its return to the shell, and (d) an access opening in the cassette shell proximate the film support, said camera apparatus comprising:

sensor means adapted during a film loading mode to enter the access opening for determining whether the filmstrip is positioned out of range of the film engaging member; and control means adapted during said film loading mode for preventing the occurrence of a perceptible camera function relating to the filmstrip, when said sensor means determines the filmstrip is positioned out of range of the film engaging member, whereby one will be alerted not to use the filmstrip.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

FILM CASSETTE

Figure 1:
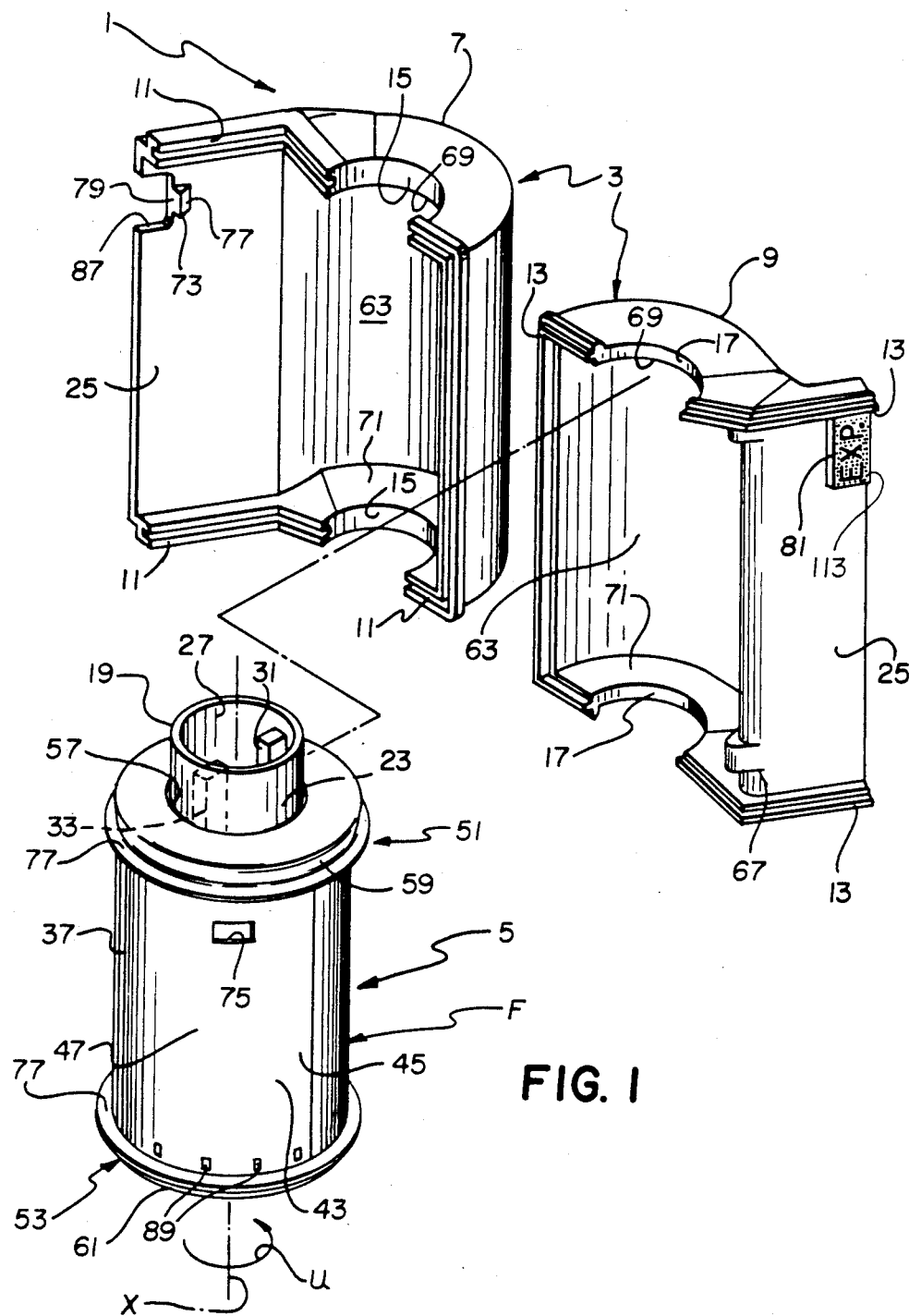
FIG. 1 is an exploded perspective view of the film cassette disclosed in cross-referenced application Serial No.
Figure 2:
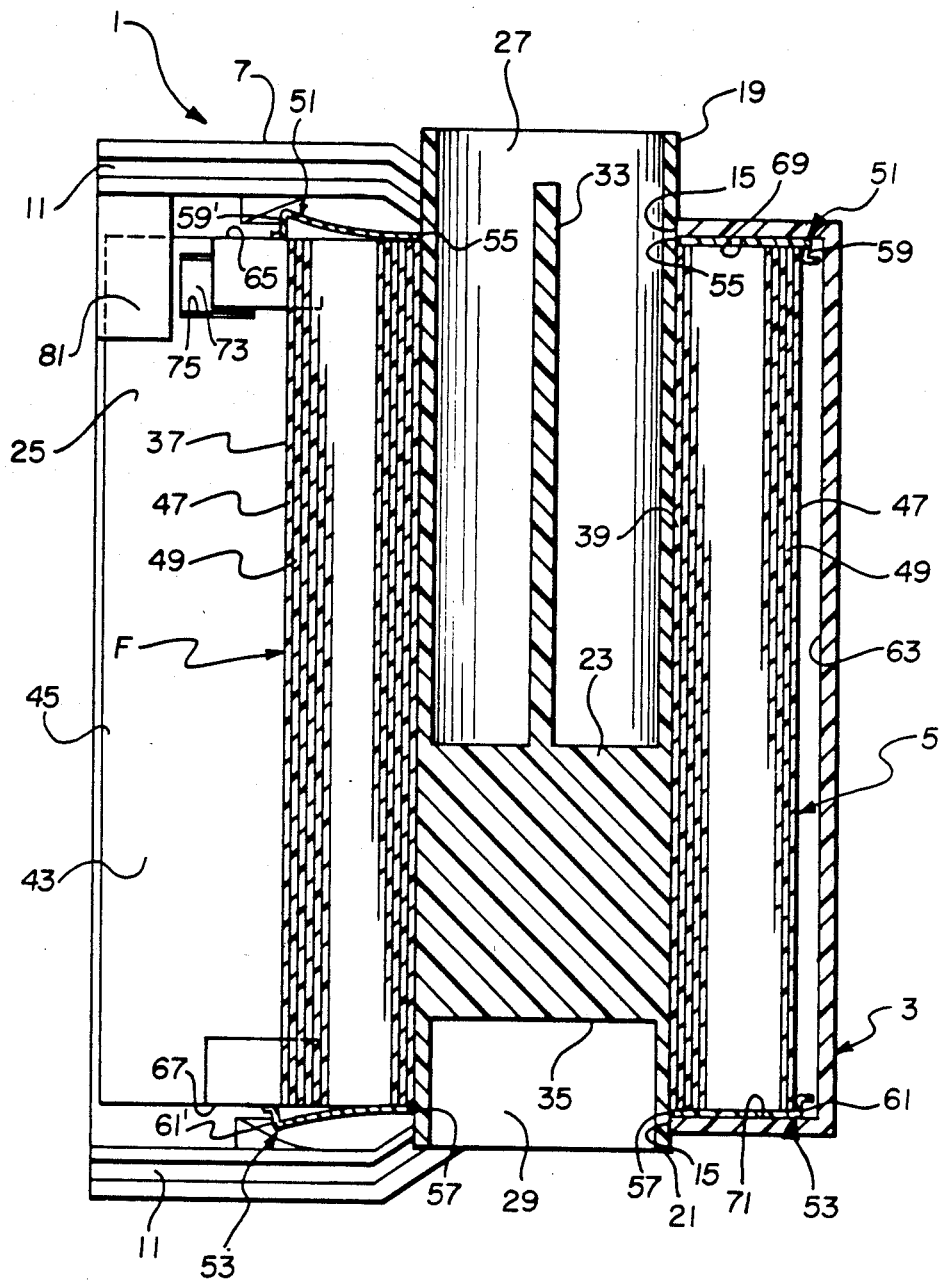
FIG. 2 is an elevation view in cross-section of the film cassette.
Figure 3:
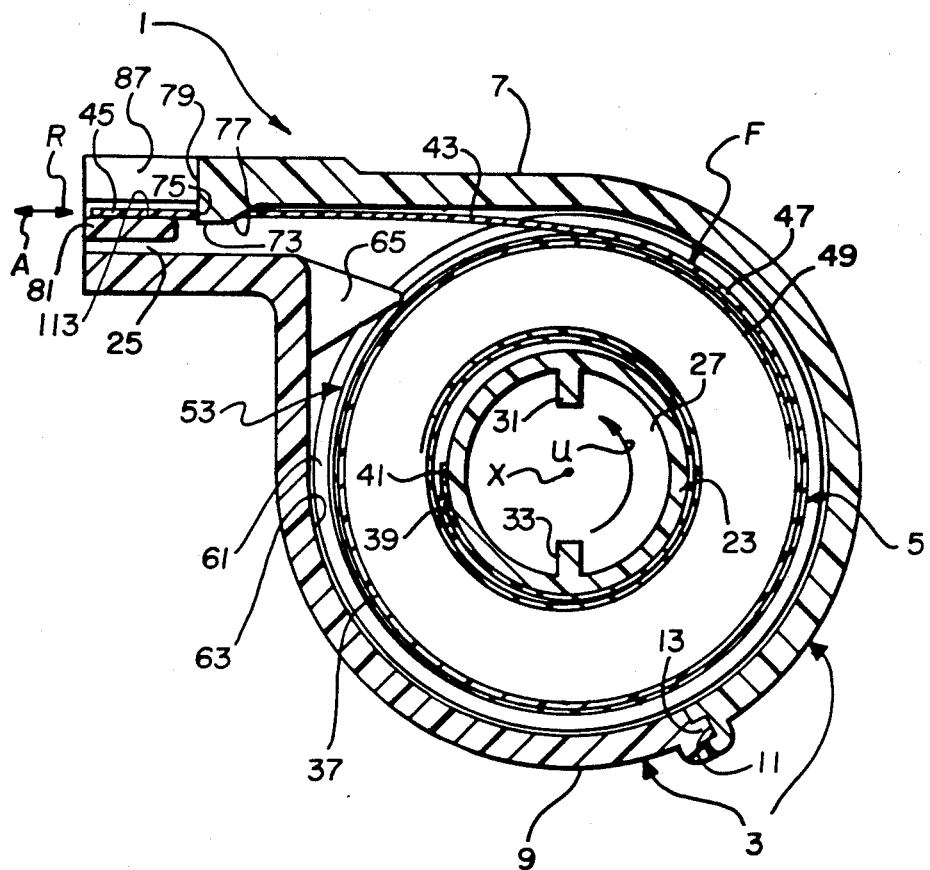
FIG. 3 is an end view in cross-section of the film cassette, showing a leader portion of the filmstrip engaged by a film engaging member located along a film passage slit to the outside of the cassette shell.

Referring now to the drawings, FIGS. 1-3 depict a 35 mm film cassette 1 similar to the one disclosed in cross-referenced application Ser. No. 296,558, and comprising a light-tight cassette shell 3 and a film spool 5 which is rotatable about an axis X within the cassette shell. The cassette shell 3 consists of two shell halves 7 and 9 which are mated along respective grooved and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction U or to rotate the spool in a winding direction opposite to the unwinding direction. See FIG. 1.

A roll 37 of convoluted 35 mm film F is wound about the spool core 23. As indicated in FIG. 3, the film roll 37 has an inner or trailing end portion 39 attached to the spool core 23 by a suitable piece of adhesive tape 41 and a film leader or leader portion 43. The film leader 43 has a leading or forward end 45 and comprises 2-3 convolutions of the film roll 37. One of these leader convolutions is the outermost convolution 47 and another of them is the next inward succeeding convolution 49.

A pair of flexible identical disks 51 and 53 are coaxially spaced along the spool core 23 to lightly rest against the opposite ends of the film roll 37. The two disks 51 and 53 cover the opposite ends of the film roll 37 and they have respective central holes 55 and 57 through which the spool core 23 longitudinally extends to permit rotation of the spool core relative to the disks. Although not shown, it is possible for the spool core 23 to include integral radially extending flanges disposed between the opposite ends of the film roll 37 and the respective disks 51 and 53. The two disks 51 and 53 have respective continuous circumferential lips 59 and 61 which extend at right angles to the peripheries of the disks to radially confine the outermost convolution 47 of the film roll 37, thereby to prevent the film roll from radially expanding or clock-springing into contact with an inner wall 63 of the cassette shell 3. As shown in FIGS. 2 and 3, the film leader 43 initially protrudes from between opposite limited sections 59' and 61' of the respective lips 59 and 61 and into the film passage slit 25.

A pair of rigid identical spreader surfaces 65 and 67 are fixed to the cassette half 9 at separate locations inwardly of the film passage slit 25 as shown in FIGS. 1-3. The two spreader surfaces 65 and 67 deflect the opposite limited sections 59' and 61' of the two lips 59 and 61 axially away from each other to an axial dimension slightly exceeding the film width. See FIG. 2. In essence, the deflected sections 59' and 61' of the two lips 59 and 61 are axially spaced sufficiently to prevent those sections of the lips from radially confining corresponding sections of the outermost convolution 47 of the film roll 37. As indicated in FIGS. 1 and 2, the remaining portions of the two lips 59 and 61 are maintained in place by inner semi-circular flat surfaces 69 and 71 of the cassette shell 3 which abut the respective disks 51 and 53, except in the vicinity of the two spreader surfaces 65 and 67. Thus, the remaining portions of the two lips 59 and 61 continue to radially confine the outermost convolution 47.

Figure 7:
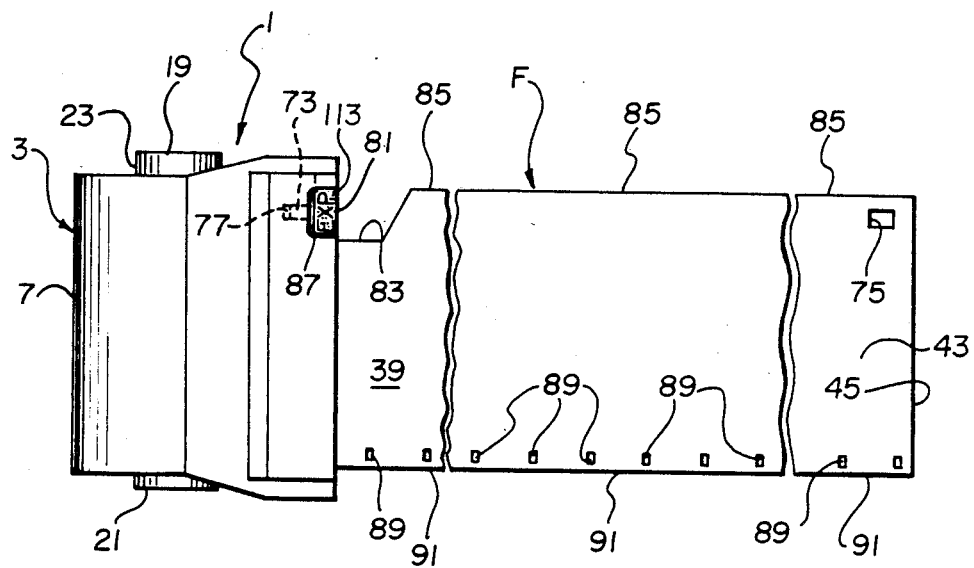
FIG. 7 is a plan view of the film cassette and the filmstrip.

In FIGS. 1, 3, and 7, it can be seen that the cassette half 7 includes an integral film retention or engaging member 73 disposed along the film passage slit 25 to enter a trapping perforation 75 in the film leader 43 in order to secure the film leader in the slit prior to initial advance of the filmstrip F from the cassette shell 3 or following midroll return of the filmstrip F to the cassette shell. The engaging member 73 is ramped along its surface 77 relative to the direction A the filmstrip is to be advanced through the slit 25 to the outside of the cassette shell 3, to allow disengagement of the film leader 43 from the engaging member in response to movement of the filmstrip in that direction. See FIGS.

3 and 4. Also, the engaging member 73 is configured (vertically in FIG. 3) along its surface 79 relative to the direction R the filmstrip F is to be returned through the slit 25 to the inside of the cassette shell 3, to prevent disengagement of the film leader 43 from the engaging member should the filmstrip be urged to move in that direction rather than in the direction A.

A flat film support 81, shown in FIGS. 1–3 and 7, is located proximate the film engaging member 73 for supporting the filmstrip F within range of the engaging member to permit the engaging member to engage the film leader 43. The trailing end portion 39 of the filmstrip F has a reduced width, effected by a cut-out 83 along the longitudinal film edge 85 that enables the filmstrip to fall away from the film support 81 to move out of range of the retention member 73 when the filmstrip is advanced sufficiently in the direction A from the cassette shell 3 to move the cut-out to the support. See FIGS. 5 and 7. The film support 81 includes an exposure-completed indicator "EXP." that is normally covered by the filmstrip F and therefore is not visible through a window or opening 87 in the cassette half 7. When the filmstrip F falls away from the film support 81, the indicator "EXP." is uncovered and can be viewed through the window 87 as shown in FIG. 7. The indicator "EXP." thus serves as a double exposure prevention warning.

The filmstrip F includes a conventional series of metering perforations 89 extending proximate the longitudinal film edge 91. The metering perforations 89 are not located proximate the longitudinal film edge 85 in order to avoid interference with the trapping perforation 75 and the cut-out 83. See FIG. 7.

Figure 4:
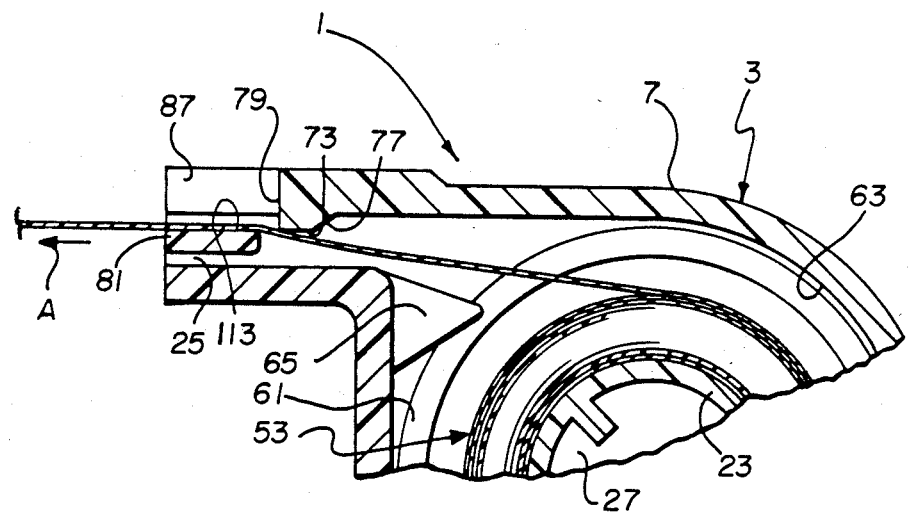
FIG. 4 is a partial end view similar to FIG. 3, showing the filmstrip during film advance from the cassette shell.

When the spool core 23 is initially rotated in the unwinding direction U, the two disks 51 and 53 may remain substantially stationary and the film roll 37, since its trailing end portion 39 is attached to the spool core, tends to expand radially to ensure a non-slipping relation between the outermost convolution 47 of the film roll and the circumferential lips 59 and 61 of the disks. See FIGS. 2 and 3. Then, rotation of the spool core 23 in the same direction will similarly rotate the two disks 51 and 53. As a result, the two spreader surfaces 65 and 67 will deflect successive sections 59' and 61' of the circumferential lips 59 and 61 axially away from each other as the respective sections are rotated past the spreader surfaces. The deflected sections 59' and 61' of the two lips 59 and 61 are returned to their original non-flexed condition by the semi-circular flat surfaces 69 and 71. As can be appreciated from FIGS. 3 and 4, the outermost convolution 97 of the film roll 37 will be freed from the radial confinement of the two lips 59 and 61 in the vicinity of the two spreader surfaces 65 and 67, thereby allowing the film leader 43 to be advanced in the direction A out of engagement with the film engaging member 73 and to the outside of the cassette shell 3. Then, each successive rotation of the spool core 23 in the unwinding direction U will advance a corresponding section of the filmstrip F from the cassette shell 3.

Figure 5:
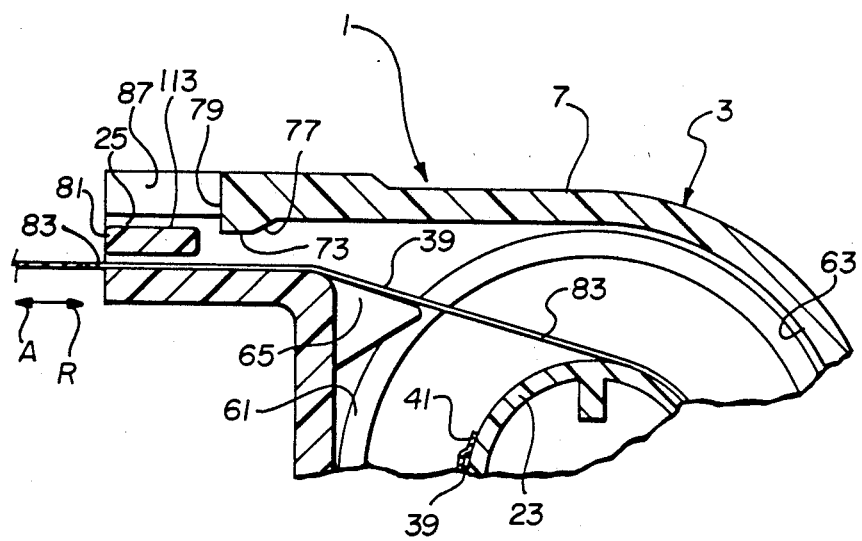
FIG. 5 is a partial end view similar to FIG. 3, showing the filmstrip after it falls away from a support member for supporting the filmstrip within range of the engaging member.
Figure 6:
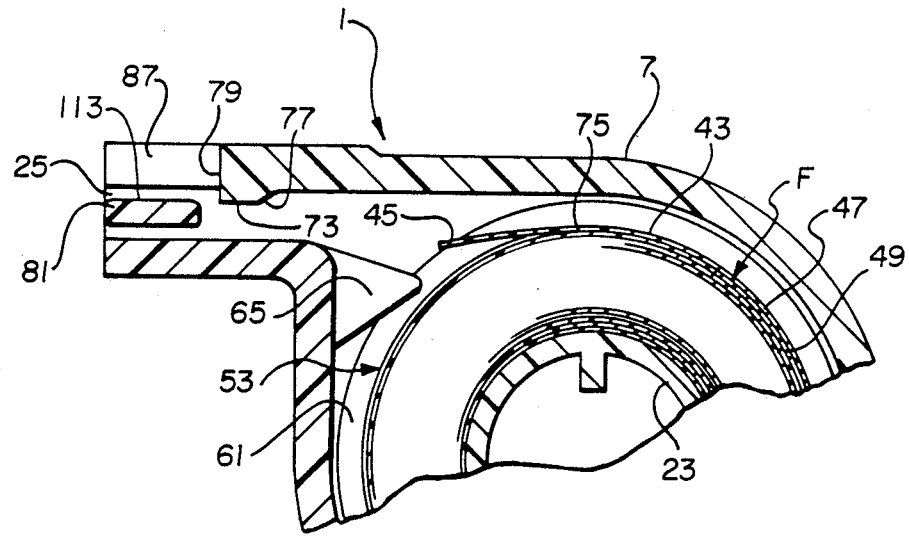
FIG. 6 is a partial end view similar to FIG. 3, showing the filmstrip after it is rewound completely into the cassette shell.

When the filmstrip F is advanced sufficiently from the cassette shell 3 to move the cut-out 83 of the trailing end portion 39 to the film support 81, the filmstrip will slip below the film support as shown in FIG. 5, thereby uncovering the indicator "EXP." to make it visible. During return of the filmstrip F in the direction R, the filmstrip F will be located below the film support 81. Thus, it will be maintained out of range of the film engaging member 73. This prevents the film leader 43 from being re-engaged by the engaging member 73 and allows the film leader (for the first time) to be wound onto the spool core 23.

If the filmstrip F is returned midroll to the cassette shell 3, i.e. before all of the available imaging areas are exposed, it will not have had the opportunity to slip below the film support 81. Thus, the filmstrip F will continue to cover the indicator "EXP." and it will remain in range of the film engaging member 73, permitting the film leader 43 to be re-engaged by the engaging member as shown in FIG. 3.

Camera Apparatus

Figure 8:
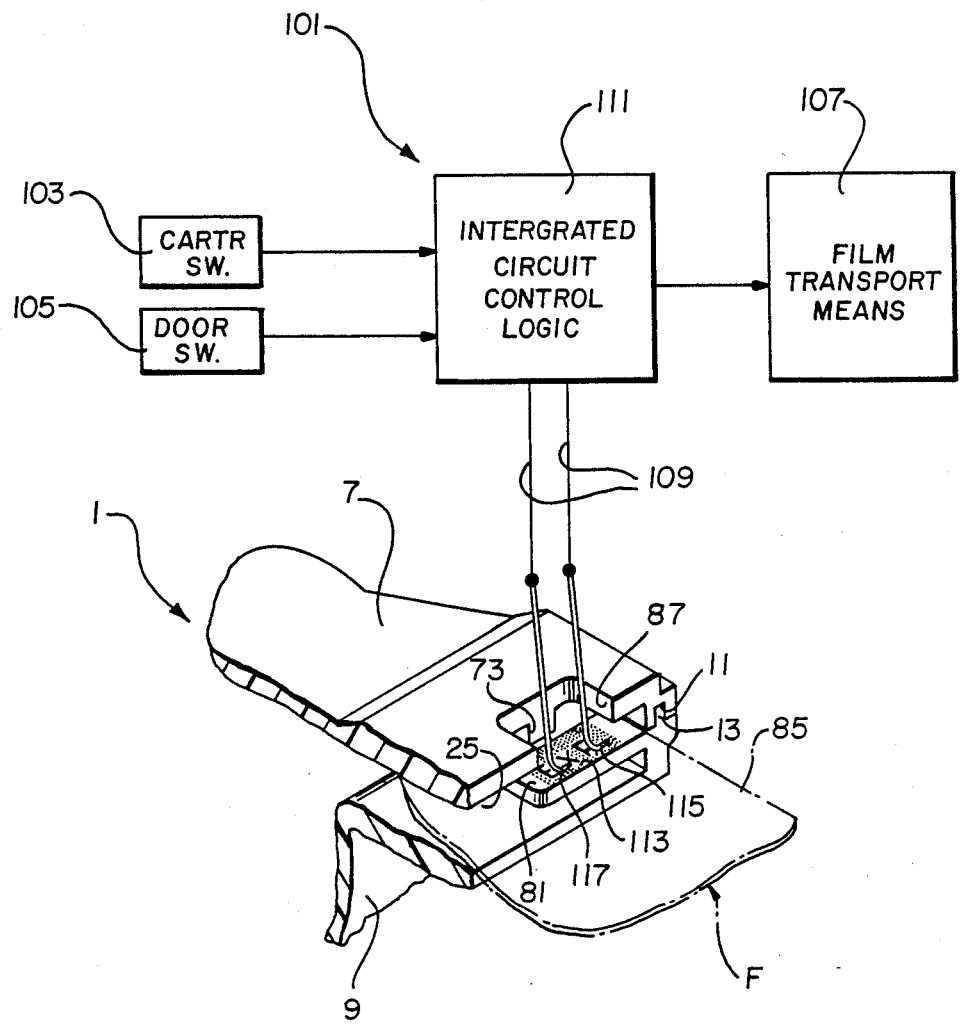
FIG. 8 is a schematic perspective view of camera apparatus intended for use with the film cassette, according to a preferred embodiment of the invention.

FIG. 8 depicts in schematic form camera apparatus 101 intended for use with the film cassette 1. Specifically, the camera apparatus 101 operates to prevent picture-taking whenever a photographer loads the film cassette 1 into a cassette-receiving chamber of a photographic camera such as disclosed in cross-referenced application Ser. No. 221,995, but the indicator "EXP" is uncovered to alert the photographer not to use the filmstrip F because it is completely exposed. The camera apparatus 101 comprises a conventional normally open, cassette sensing switch 103 which is closed when the film cassette 1 is loaded into the cassette receiving chamber; a conventional, normally open, door sensing switch 105 which is closed when a rear door of the photographic camera is closed; motorized film transport means 107, such as disclosed in cross-referenced application Ser. No. 221,995, for advancing the filmstrip from the cassette shell 3 and for returning it to the shell; sensor means 109 adapted during loading of the film cassette into the cassette receiving chamber to enter the window 87 in the cassette half 7 to determine whether the filmstrip F is removed from the film support 81; and an integrated circuit (IC) control logic 111 for preventing enablement of the motorized film transport means when, following loading of the film cassette into the cassette receiving chamber, the sensor means determines the filmstrip is removed from the film support.

Preferably, the filmstrip F is electrically non-conductive (as is typical), and the film support 81 has an electrically conductive surface 113 normally covered by the filmstrip but uncovered when the filmstrip is removed from the film support. The sensor means 109 includes a pair of spaced electrically conductive sensors 115 and 117 which alternatively rest against the filmstrip F as shown in FIG. 8, when the electrically conductive surface 113 is covered by the filmstrip, to thereby prevent the sensors from being electrically connected, or rest against the conductive surface, when the conductive surface is uncovered, to thereby electrically connect the sensors.

Operation

Figure 9:
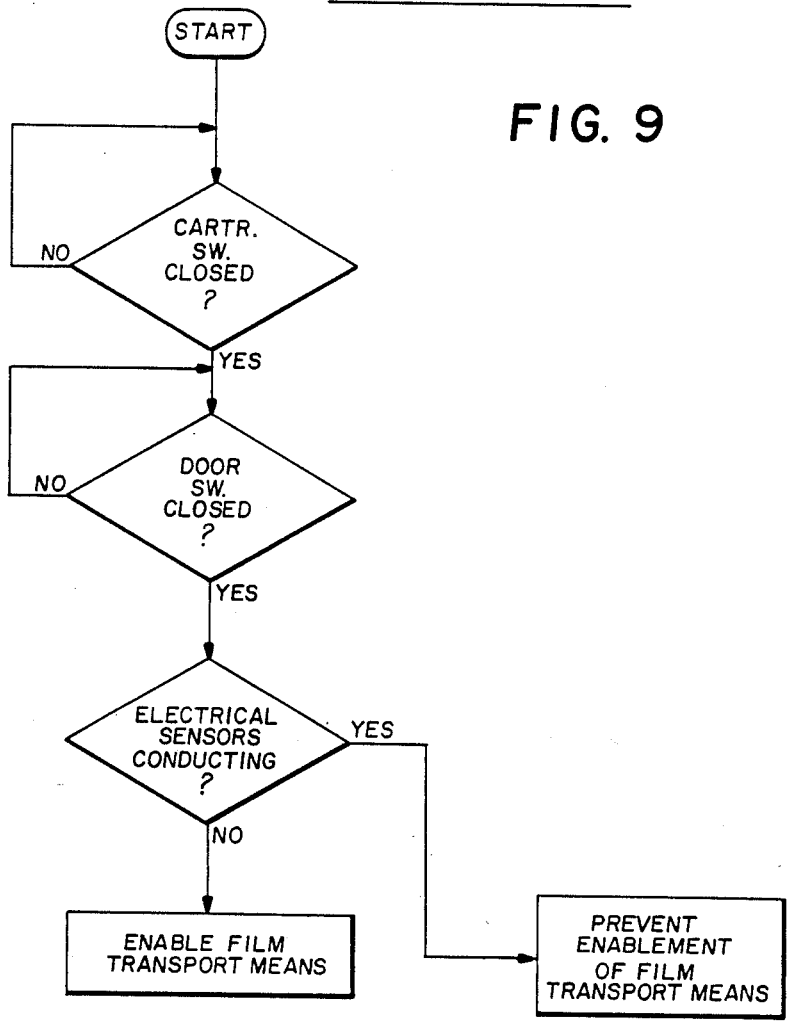
FIG. 9 is a flow chart depicting operation of the camera apparatus.

FIG. 9 depicts a film loading mode or sequence insofar as operation of the camera apparatus 101 is concerned. The steps of the film loading mode are as follows:

(a) The control logic 111 first undertakes an interrogation to determine whether the cassette sensing switch 103 is closed.

(b) If the cassette sensing switch 103 is closed, which indicates the film cassette 1 has been loaded into the cassette receiving chamber, the control logic 111 undertakes an interrogation to determine whether the door sensing switch 105 is closed.

(c) If the door sensing switch 105 is closed, which indicates the rear door is closed, the control logic 111 undertakes an interrogation to determine whether the two sensors 113 and 115 are electrically connected.

(d) If the two sensors 113 and 115 are not electrically connected, which indicates the film leader 43 is covering the electrically conductive surface 113 (as, for example, in a fresh film load), the control logic 111 enables the film transport means 107 to permit the transport means to be operated.

(e) If the two sensors 113 and 115 are electrically connected, which indicates the electrically conductive surface 113 is not covered, the control logic 111 prevents enablement of the film transport means 107, thereby altering the photographer that the filmstrip F is completely exposed.

The film loading mode shown in FIG. 9 is designed to occur only during loading of the film cassette 1 into the cassette receiving chamber. Thus, it is designed to avoid confusion with a film rewind cycle of the photographic camera in which, after the last picture is taken, the filmstrip F first slips below the film support 81 (uncovering the conductive surface 113) and then is returned in the direction R as shown in FIG. 5 to the cassette shell 3. In the rewind cycle, although the conductive surface 113 is uncovered, the motorized film transport means 107 is not prevented from being operated. This may be achieved, for example, simply by the inclusion of a normally open film sensing switch in the photographic camera, which would be positioned along the film path outside the cassette shell and would be closed by film pressure to prevent disablement of the film transport means 107 whenever the filmstrip F is located outside the shell.

The invention has been described with reference to a preferred embodiment. However, it will be appreciated that variations and modifications can be effected within the ordinary skill in the art without departing from the scope of the invention. For example, in the film loading mode shown in FIG. 9, instead of disabling the motorized film transport means 107 some other perceptible camera function relating to the filmstrip, such as shutter operation, could be prevented in order to alert the photographer that the filmstrip is completely exposed. Alternatively, a visible and/or audible indication could be provided.

Also, other means, rather than the sensor means 109 could be employed to determine whether the filmstrip F is removed from the film support 81. For example, optical means for recognizing the difference in reflectivity between the filmstrip F and the film support 81 might be used. Alternatively, the sensor means 109 and the film support 81 might be designed to cause the sensor means to undergo a relative change in position when the filmstrip is removed from the support.

I claim:

1. Camera apparatus intended for use with a film cassette including (a) an internal film engageable member for engaging a leader portion of a filmstrip prior to its initial advance from the cassette shell and for re-engaging the leader portion following its return to the shell, (b) an internal film support for normally supporting the filmstrip within engaging range of the film engageable member to enable the engageable member to engage the leader portion, (c) a trailing end portion of the filmstrip configured to fall away from the film support to move the filmstrip out of engaging range of the film engageable member, when the filmstrip has been advanced sufficiently from the cassette shell to position the trailing end portion at the film support, to prevent the engageable member from re-engaging the leader portion following its return to the shell, and (d) an access opening in the cassette shell proximate the film support, said camera apparatus comprising:

sensor means adapted during a film loading mode to enter the access opening for determining whether or not the filmstrip has fallen away from the film support to thus determine whether or not the filmstrip is positioned out of engaging range of the film engageable member; and control means adapted during said film loading mode for preventing the occurrence of a perceptible camera function relating to the filmstrip, when said sensor means determines the filmstrip has fallen away from the film support to be positioned out of engaging range of the film engageable member, whereby one will be altered not to use the filmstrip.

2. Camera apparatus as recited in claim 1, further comprising:

motorized film transport means operable during said film loading mode for advancing the filmstrip from the cassette shell, and wherein said control means prevents operation of said film transport means during the film loading mode, when said sensor means determines the filmstrip is positioned out of range of the film engageable member.

3. Camera apparatus as recited in claim 1, further intended for use with a film cassette including a film support that is normally covered by the filmstrip but is uncovered whenever the filmstrip is positioned out of range of the film engaging member, and wherein said sensor means is capable of distinguishing physically between the film support and the filmstrip to determine whether the film support is covered or uncovered.

4. Camera apparatus as recited in claim 1, further intended for use with a film cassette including a filmstrip that is electrically non-conductive and a film support that has an electrically conductive surface normally covered by the filmstrip but uncovered whenever the filmstrip is positioned out of range of the film engaging member, and wherein said sensor means includes a pair of spaced electrically conductive sensors adapted during said film loading mode to rest against the filmstrip to thereby prevent them from being electrically connected, when the electrically conductive surface is covered by the filmstrip, and to rest against the conductive surface to thereby electrically connect them, when the conductive surface is uncovered.

5. A photographic combination of a film cassette and camera apparatus intended for use with said film cassette, wherein said film cassette comprises:

an internal film engageable member for engaging a leader portion of a filmstrip prior to its initial advance from the cassette shell and for re-engaging the leader portion following its return to the shell;

an internal film support for normally supporting the filmstrip within engaging range of said film engageable member to enable the engageable member to engage the leader portion;

a trailing end portion of the filmstrip configured to fall away from said film support to move the filmstrip out of engaging range of said film engageable member, when the filmstrip has been advanced sufficiently from the cassette shell to position said trailing end portion at the film support, to prevent the engageable member from re-engaging the leader portion following its return to the shell; and an access opening in the cassette shell proximate said film support, and wherein said camera apparatus comprises:

sensor means adapted during a film loading mode to enter said access opening for determining whether the filmstrip is positioned out of engaging range of said film engageable member; and control means adapted during said film loading mode for preventing the occurrence of a perceptible camera function relating to the filmstrip, when said sensor means determines the filmstrip is positioned out of engaging range of said film engageable member, whereby on will be alerted not to use the filmstrip.

* * * * *

UNITED STATES PATENT AND TRADEMARK OFFICE
CERTIFICATE OF CORRECTION

PATENT NO. : 4,903,053
DATED : February 20, 1990
INVENTOR(S) : Donald M. Harvey

It is certified that error appears in the above-identified patent and that said Letters Patent is hereby corrected as shown below:

Col. 3, line 7         after "No." insert --296,558--.

Signed and Sealed this

Ninth Day of April, 1991

Attest:

HARRY F. MANBECK, JR.

Attesting Officer    Commissioner of Patents and Trademarks